(12) United States Patent
Bravo

(10) Patent No.: US 11,259,513 B1
(45) Date of Patent: Mar. 1, 2022

(54) ELECTRIC CLIP RECEIVER FOR OUTRIGGERS

(71) Applicant: Erick Bravo, Marathon, FL (US)

(72) Inventor: Erick Bravo, Marathon, FL (US)

( * ) Notice: Subject to any disclaimer, the term of this patent is extended or adjusted under 35 U.S.C. 154(b) by 0 days.

(21) Appl. No.: 17/352,002

(22) Filed: Jun. 18, 2021

(51) Int. Cl.
*A01K 91/08* (2006.01)
*B63B 35/16* (2006.01)

(52) U.S. Cl.
CPC ............ *A01K 91/08* (2013.01); *B63B 35/16* (2013.01)

(58) Field of Classification Search
CPC .... A01K 91/08; A01K 91/10; A01K 89/0165; A01K 91/00; A01K 91/18
USPC .................. 43/27.2, 27.3, 26.1, 43.12, 43.15
See application file for complete search history.

(56) References Cited

U.S. PATENT DOCUMENTS 4,248,002 A * 2/1981 McNellis ............... A01K 91/08
242/397.1
4,875,428 A * 10/1989 Schlesch ................ A01K 91/08
114/255
8,656,632 B1 * 2/2014 Mercier ................. A01K 91/18
43/27.4

FOREIGN PATENT DOCUMENTS

WO WO-2008110650 A1 * 9/2008 ............. A01K 91/08

* cited by examiner

*Primary Examiner* — Peter M Poon
*Assistant Examiner* — Danielle A Clerkley
(74) *Attorney, Agent, or Firm* — Ruben Alcoba, Esq.

(57) ABSTRACT

An Electric clip receiver that is attached to an outrigger. The electric clip receiver comprises of a housing that is configured to attach to either to a shock cord clip or to a fixed mount on a boat via a mounting bracket that is attached to the housing. An electric motor that has a gear that is powered by a battery source that is housed within the housing. a pulley that is attached to the housing and an outrigger line that is looped on the pulley that is configured to be connected to the outrigger. An outrigger release clip that is attached to the outrigger line at a specific location. A microchip that is programmed to control the electric motor's forward and reverse function that is housed within the housing. And, a switch that controls the microchip's control of the electric motor.

4 Claims, 4 Drawing Sheets

ELECTRIC CLIP RECEIVER FOR OUTRIGGERS

TECHNICAL FIELD

The present invention pertains to an electric clip receiver for outriggers that are used on fishing vessels. The electric clip receiver allows a user to set a fishing line on an outrigger release clip using a minimal amount of force.

BACKGROUND

Outriggers are long poles deployed from the back or the sides of fishing vessels to widen the trolling area and accommodate multiple lines. Outriggers are normally used when trolling for fish.

Outriggers are long poles that may be fitted on both sides of a fishing vessel and that are designed to hold a fishing line. Outriggers allow a user to reel in and release his or her fishing line from an outrigger release clip via a system of pulleys and clips. Outriggers vary in lengths and normally they range from 12 to 35 feet.

Trolling is a fishing technique that involves dragging several fishing lines off the back or the sides of a boat as the boat moves through a body of water.

Outriggers are advantageous to fishermen because they minimize fishing lines from being tangled and they also increase the chances of the fishermen hooking the fish. The chances of hooking fish are increased because outriggers allow a fisherman to cover more water, outriggers keep bait out of whitewater, and they provide the fishermen a clear view of the fish.

Presently, most outrigger require a fisherman to manually reel and release the fisherman's fishing line from the outrigger release clip using the manual force of the fisherman. The present invention provides an electronic device that allows the fisherman to reel and release the fisherman's fishing line from the outrigger release clip without the fisherman having to use manual force.

SUMMARY

The present invention is directed to an electric clip receiver that is attached to an outrigger.

The electric clip receiver comprises of a housing that is configured to attach either to a shock cord clip or to a fixed mount on a boat via a mounting bracket that is attached to the housing. An electric motor that has a gear that is powered by a battery source that is housed within the housing. A pulley that is attached to the housing and an outrigger line that is looped on the pulley is configured to be connected to the outrigger. An outrigger release clip that is attached to the outrigger line at a specific location. A microchip that is programmed to control the electric motor's forward and reverse function that is housed within the housing. And, a switch that controls the microchip's control of the electric motor.

An object of the present invention is to provide a device that will allow a fisherman to set a line on an outrigger release clip using a minimal amount of manual force.

Another object of the present invention is to provide a device that will automatically move an outrigger release clip inward and outward from an outrigger.

Yet another object of the present invention is to provide a device that will speed the reloading of a fishing line on an outrigger release clip.

DRAWINGS

These and other features, aspects, and advantages of the present invention will become better understood with regards to the following description, appended claims, and drawings where:

DESCRIPTION

Figure 1:
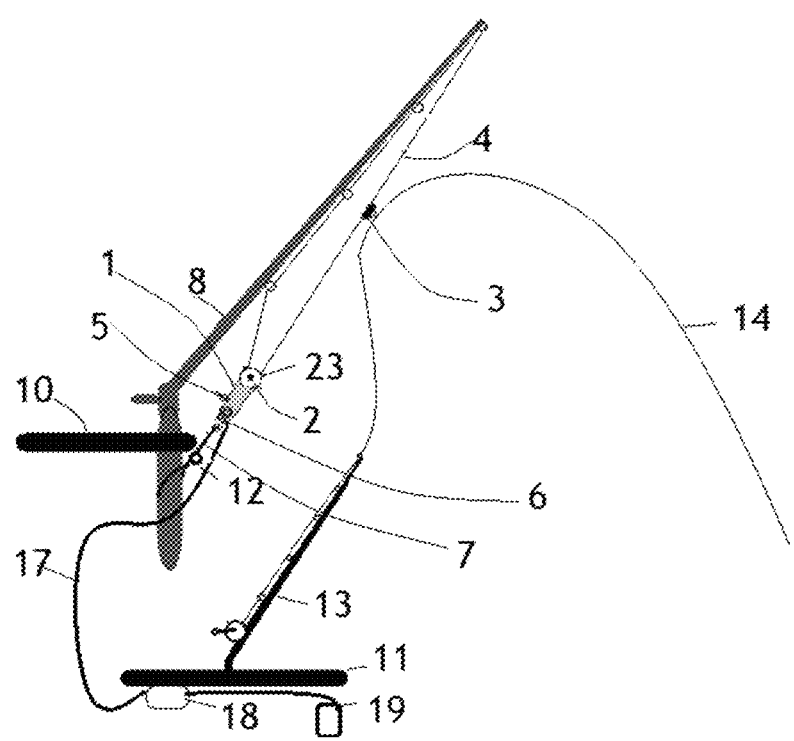
FIG. 1 is a side view of a first embodiment of the present invention that is mounted on an outrigger and showing how a fishing rod is placed on a boat and the fishing line is placed on the outrigger release clip that is attached to the outrigger line.
Figure 2:
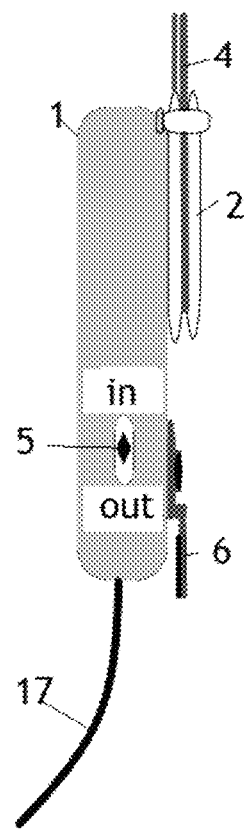
FIG. 2 is a top plan view of the embodiment of FIG. 1.
Figure 3:
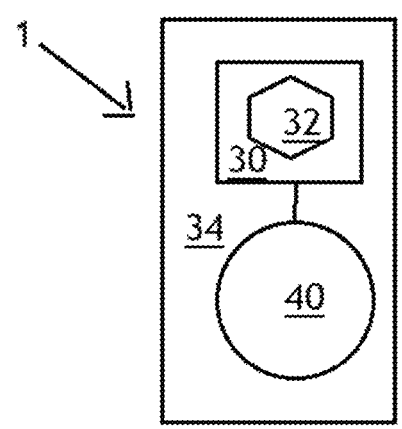
FIG. 3 is a schematic of the internal elements of the present invention.
Figure 4:
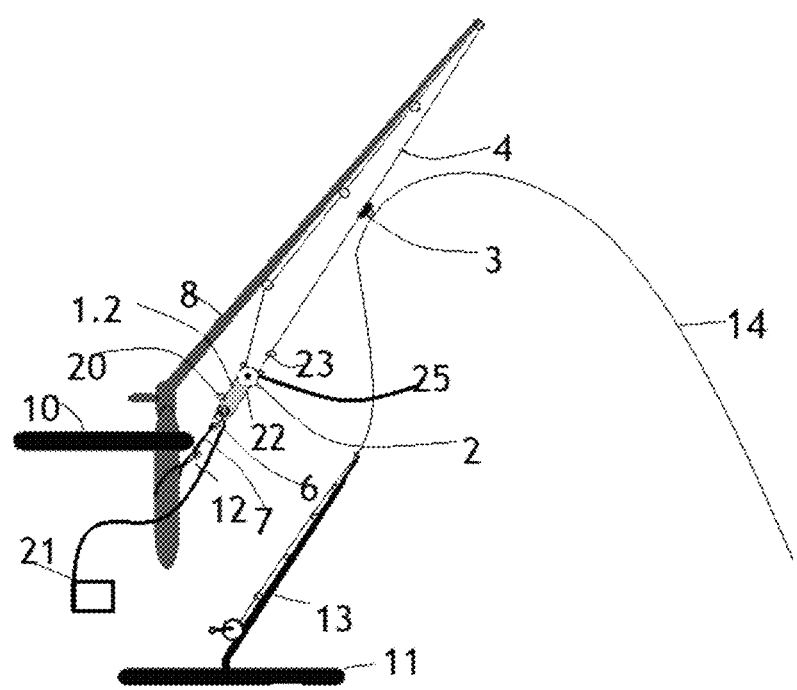
FIG. 4 is a side view of a second embodiment of the present invention that is mounted on an outrigger and showing how a fishing rod is placed on a boat and the fishing line is placed on the outrigger release clip that is attached to the outrigger line.
Figure 5:
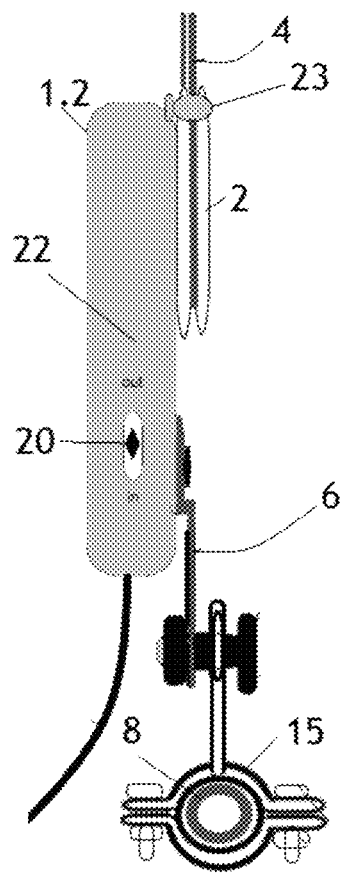
FIG. 5 is a top plan view of the embodiment of FIG. 3.
Figure 6:
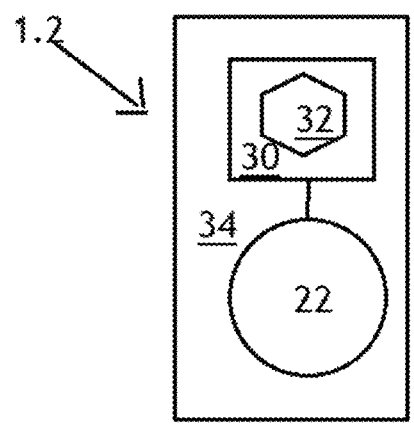
FIG. 6 is a schematic of the internal elements of the embodiment described in the second embodiment.

Referring to FIGS. 1-6, the present invention is an electric clip receiver for outriggers.

The electric clip receiver comprises of a housing 1 or 1.2 that is configured to attach to either to a shock cord 7 or to a fixed mount 15 on a boat 10 via a mounting bracket 6 that is attached to the housing 1 or 1.2. An electric motor 30 that has a gear 32 that is operatively connected and powered by a battery source 19 and 21 that is housed within the housing 1 or 1.2. A pulley 2 that is attached to the housing 1 or 1.2 and an outrigger line 4 that is looped on the pulley 2 that is configured to be connected to the outrigger 8. An outrigger release clip 3 that is attached to the outrigger line 4 at a specific location, the specific location is configured to be determined by the distance in which a user desires a user's fishing line 14 to be separated from an edge of the boat 11. A microchip 34 that is programmed to control the electric motor's 30 forward and reverse function that is housed within the housing 1 or 1.2, the microchip 34 is configured to be programmed to move the outrigger line 4 inward and outward from the pulley 2 so that when the fishing line 14 is released from the outrigger release clip 3 the user does not have to manually pull the outrigger line toward the pulley 2 to reload the outrigger release clip 3 with the fishing line 14 and then manually have to let out the outrigger line 4 to the desired location in which the user wishes to have the fishing line 14. The fishing line is attached to a fishing pole 13, rest on the outrigger 8. And, a switch 5 or 20 that controls the microchip's 34 control of the electric motor 30.

In a first embodiment of the present invention, the electric clip receiver further comprises of a forward and reverse relay controller 18 that is operative connected to the microchip 34 that controls the electric motor 30. The forward and reverse relay controller is operatively connected to the microchip via a power and control cord 17. The forward and reverse relay controller 18 preferably is a two-channel motor forward and reverse relay control. The shock cord is attached to a shock cord clip 12 in this embodiment.

In another embodiment of the present invention, the microchip 34 has an internal timer 40 that determines the distance for the specific location in which the outrigger release clip 3 will rest on the outrigger 8 when the fishing line 14 is placed on the outrigger release clip 3, and wherein the switch 5 is a three-position momentary toggle switch 5.

In yet another embodiment of the present invention, the electric clip receiver comprises of a micro sensor 22 that is housed within the housing 1.2 and that is operatively connected to the microchip 34, the micro sensor 22 is configured to detect a mark 23 on the outrigger line 4, the mark 23 will allow the microchip 34 to control the movement of the outrigger line 4, and wherein the switch 5 is a three-position momentary polarity reverse switch 20.

All embodiments of the present invention can have a an outrigger line guide 25 that is defined on the pulley 2.

An advantage of the present invention is that it provides a device that allows a fisherman to set a fishing line on an outrigger release clip using a minimal amount of manual force.

Another advantage of the present invention is that it provides a device that automatically moves an outrigger release clip inward and outward from an outrigger.

Yet another advantage of the present invention is that it provides a device that speeds the reloading of a fishing line on an outrigger release clip.

The embodiments of the electric clip receiver for outriggers described herein are exemplary and numerous modifications, combinations, variations, and rearrangements can be readily envisioned to achieve an equivalent result, all of which are intended to be embraced within the scope of the appended claims. Further, nothing in the above-provided discussions of the electric clip receiver for outriggers should be construed as limiting the invention to an embodiment or a combination of embodiments. The scope of the invention is defined by the description, drawings, and appended claims.

What is claimed is:

1. An electric clip receiver for outriggers, the electric clip receiver comprises: a housing having a mounting bracket configured to attach to one of: a shock cord clip and a fixed mount on a boat; an electric motor having a gear powered by a battery source, the electric motor housed within the housing; a pulley attached to the housing and an outrigger line, the outrigger line being looped on the pulley and configured to be connected to an outrigger; an outrigger release clip attached to the outrigger line and configured to releasably hold a fishing line at a specific location on the outrigger line, the specific location is configured to be determined by a distance in which a user desires his or her fishing line to be separated from an edge of the boat; a microchip housed within the housing, the microchip programmed to control forward and reverse function of the electric motor and move the outrigger line inward and outward from the pulley in order to automatically move the outrigger release clip, the user does not have to manually pull the outrigger line toward the pulley to reload the outrigger release clip with the fishing line and then manually let out the outrigger line; and a switch that controls the microchip's control of the electric motor.

2. The electric clip receiver for outriggers of claim 1, the electric clip receiver further comprises a forward and reverse relay controller operatively connected to the microchip that controls the electric motor.

3. The electric clip receiver for outriggers of claim 1, wherein the microchip has an internal timer that determines the distance for the specific location in which the outrigger release clip rests on the outrigger line, when the fishing line is placed on the outrigger release clip, and wherein the switch is a three-position momentary toggle switch.

4. The electric clip receiver for outriggers of claim 1, further comprising a micro sensor housed within the housing and operatively connected to the microchip, the micro sensor is configured to detect a mark on the outrigger line, the mark allowing the microchip to control movement of the outrigger line, and wherein the switch is a three-position momentary polarity reverse switch.

* * * * *